May 7, 1957 W. J. TELL 2,791,346
MAGNETIC RECEIVER
Filed July 8, 1953 2 Sheets-Sheet 1
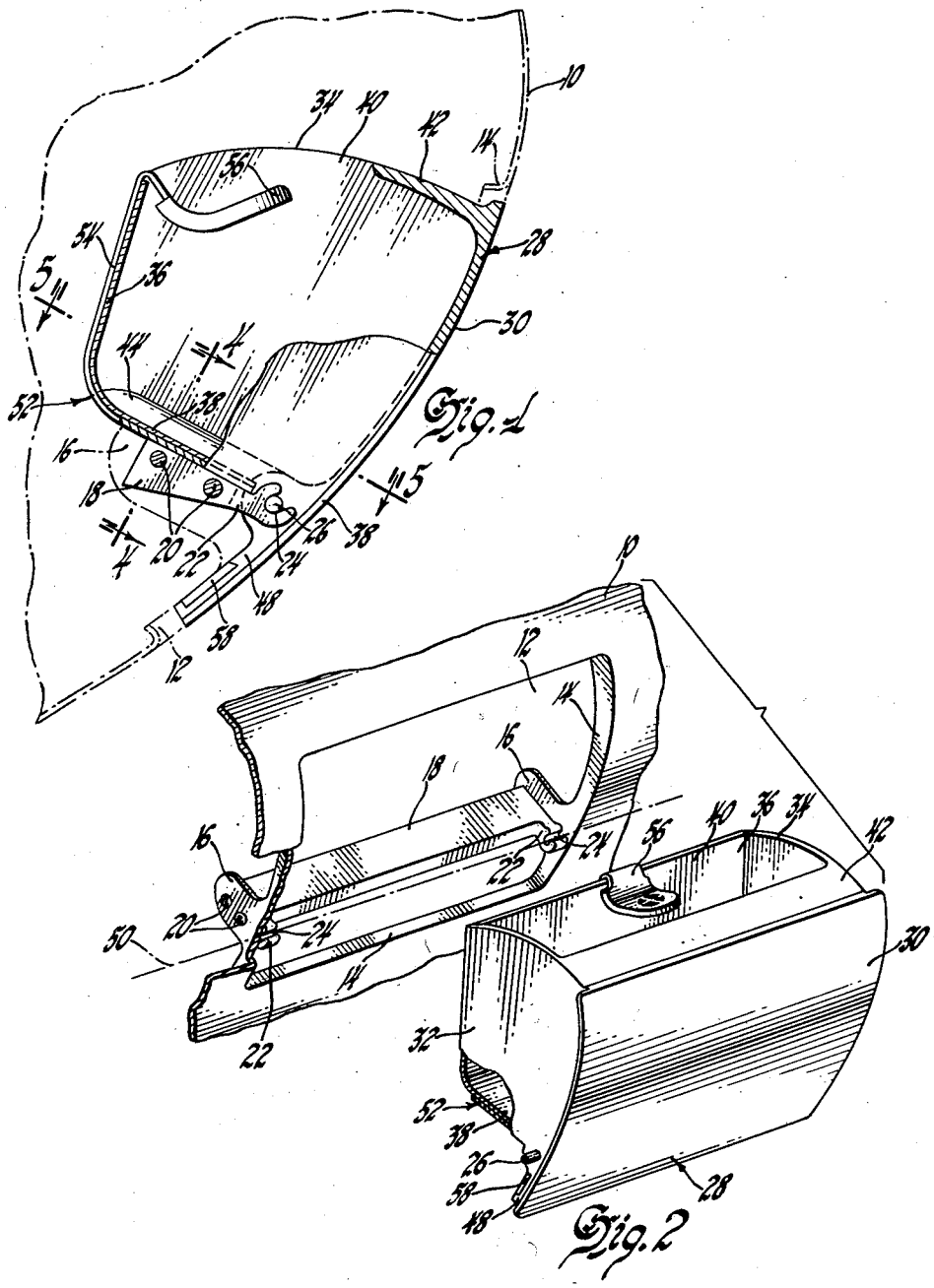
INVENTOR
William J. Tell
BY L.D.Burch
ATTORNEY May 7, 1957 W. J. TELL 2,791,346
MAGNETIC RECEIVER
Filed July 8, 1953 2 Sheets-Sheet 2
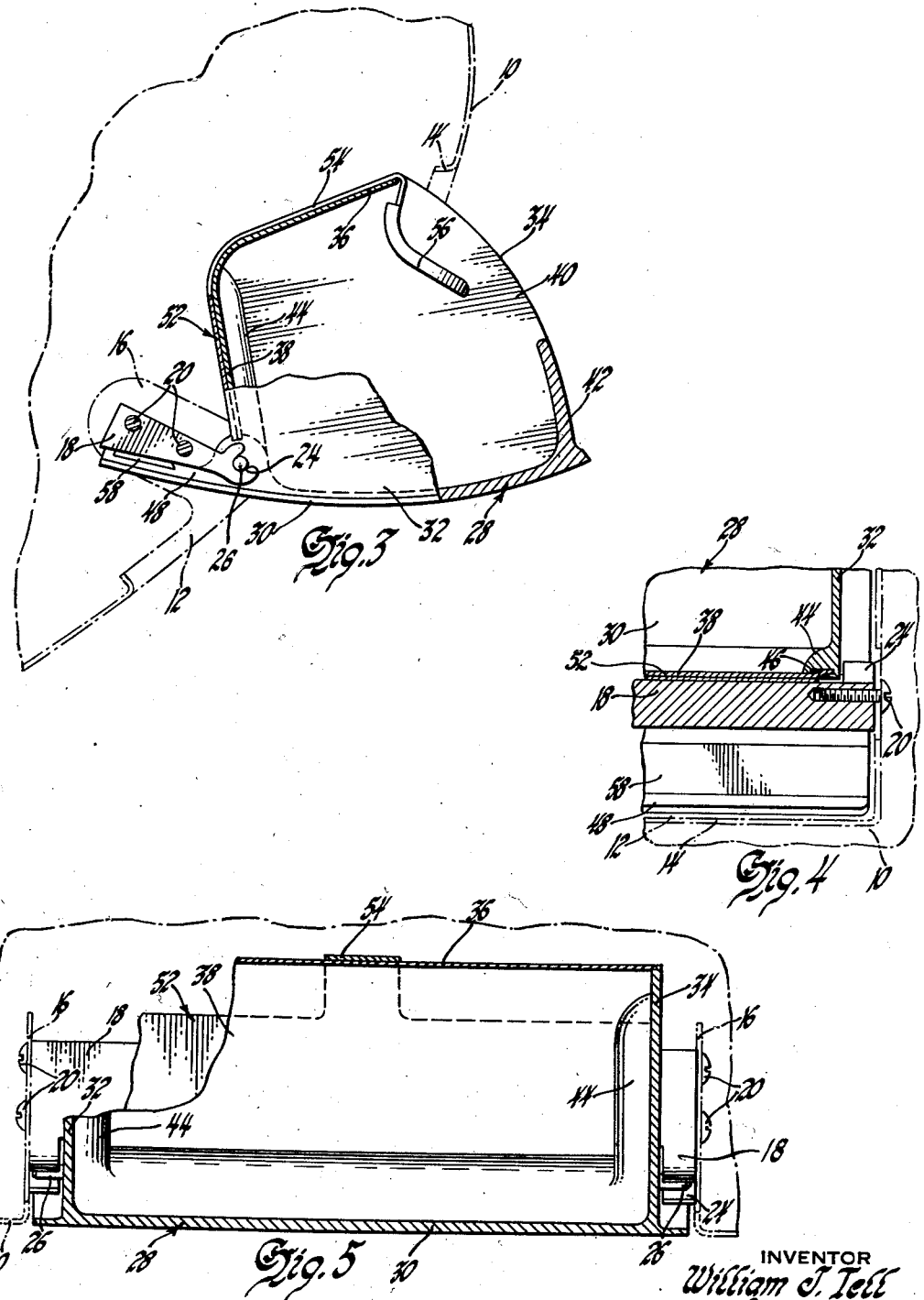
INVENTOR
William J. Tell
BY
ATTORNEY

United States Patent Office 2,791,346
Patented May 7, 1957

2,791,346
MAGNETIC RECEIVER

William J. Tell, Birmingham, Mich., assignor to General Motors Corporation, Detroit, Mich., a corporation of Delaware Application July 8, 1953, Serial No. 366,741

9 Claims. (Cl. 220—18)

This invention relates to ash trays and similar receptacles which are normally recessed within a housing or other enclosure and which are adapted to be withdrawn therefrom for use.

In providing a receptacle for the collection of cigarette ashes, waste paper, and the like in an automotive or other passenger vehicle, it is customary to provide a receptacle which is easily acecssible for use, securely mounted to prevent upset, and retractable from sight when no longer in use. Such containers are generally housed within instrument panels, arm rests, seat backs or walled surfaces convenient to those using the containers, and in a retracted position are adapted to conform to the general contours of the housing means therefore to provide a more pleasing appearance.

In such receptacles it is desirable to have a means for completely withdrawing the receptacle for emptying and for providing positive open and closed positioning to prevent rattling and unintentional closing. These features have heretofore necessitated the use of complicated spring means and other small, inter-associated members at increased manufacturing and assembly expense.

It is now proposed to provide a container or receptacle, particularly adaptable for use within passenger vehicles which is simple to manufacture, capable of fabrication from inexpensive materials and comprises a minimum number of separate parts for greater ease in assembly. It is an object of this invention to provide a retractable receptacle which may be positively held in an open or closed position, and from accidental removal by a new and novel magnetic means much less complex than means heretofore employed for such purposes. It is also an object of this invention to provide magnetic means in association with a receptacle for limiting movement of the receptacle and for holding the receptacle in such limited positions. It is another object of this invention to provide a receptacle or container which may be mounted in a convenient location, readily accessible for use, and which when retracted will blend in with the surroundings within which it is housed.

In the drawings:

Figure 1 is a phantom view of a part of a vehicle instrument panel showing the proposed device mounted therein.

Figure 2 is an exploded perspective view of the device as adapted for insertion within a receptive enclosure or housing.

Figure 3 shows the proposed device as mounted within an instrument panel and openly positioned therein.

Figure 4 is a cross-sectional view of a portion of Figure 1 as viewed in the plane of line 4—4 in the direction of the arrows thereon.

Figure 5 is a cross-sectional view of the device shown in Figure 1 as viewed in the plane of line 5—5 in the direction of the arrows thereon.

An instrument panel, seat back, or other substantially vertical panel member 10 forming a part of a motor vehicle or other structure is provided with an opening 12. A flange 14 is formed around the opening 12 and extends behind the panel member 10. Rearwardly extending parallel supports 16 are formed from the flange 14 adjacent the sides of the opening 12. A magnetic bar 18 is disposed across the opening 12 and behind the panel member 10 by having its outer ends secured to the supports 16 by screws 20. Arms 22 are formed from the ends of the bar magnet 18 and extend forwardly to provide sockets or open bearings 24 adjacent the sides of the opening 12. Pivot pins 26 secured on opposite sides of an ash receiver are adapted to be received within the bearings 24 to provide means for pivotally supporting the ash receiver within the opening 12.

The ash receiver or receptacle 28 has a front wall 30, side walls 32 and 34, back wall 36, and bottom plate 38 formed to provide a chamber 40 adapted to receive cigarette ashes, butts, waste paper and the like. Although the ash receiver 28 may be made in any convenient manner in the present instance it is shown as a structure having the sidewalls 32 and 34 formed integral with the front wall 30 and a wall member 42 covering a part of the top of the chamber 40. Enlarged sections 44 are formed near the lower edges of the side walls 32 and 34 and have grooves 46 formed therein. The side edges of the bottom plate 38 are received within the grooves 46 and the bottom plate is then bent upwardly and secured to the back edges of the side walls 32 and 34 to form the back wall 36. The front wall or cover plate 30 of the ash receiver 28 is extended beneath the bottom plate 38 to form a downwardly extending skirt 48. The cover plate skirt 48 also extends beneath the pivotal axis 50 about which the ash receiver 28 is adapted to be rotated within the opening 12. A magnetically responsive backing plate 52 is secured across the botom of the ash receiver 28. A portion 54 of the backing plate 52 extends up the back wall of the receptacle 28 and is bent over the upper edge of the back wall and positioned within the chamber 40 to provide a snuffer 56. A magnetically responsive strip 58, similar to that of the backing plate 52, is secured across the inner surface of the cover plate skirt 48.

The ash receiver 28 is removably mounted within the opening 12 formed through the panel member 10 by engaging the pivot pins 26 within the open bearings 24. The pivot pins 26 are magnetically engaged by the open bearings 24 which are, as aforementioned, part of the bar magnet 18, thereby securing the ash receiver 28 within the opening 12 and against accidental removal. In the closed position, as shown in Figure 1, the backing plate 52 on the bottom of the receptacle 28 engages and is magnetically held to the bar magnet 18. In this position the cover plate 30 lies flush with the panel member 10 and substantially closes the opening 12. To rotate the ash receiver 28 to the open position as shown in Figure 3 pressure is exerted, by an operator, to the lower portion or skirt 48 of the cover plate 30. Inward movement of the cover plate skirt 48 rotates the bottom of the receptacle out of engagement with the magnetic bar 18. The ash receiver 28 is tilted forwardly until the magnetic strip 58 on the cover plate skirt 48 engages the bar magnet 18. Magnetic attraction between the strip 58 and the bar magnet 18 holds the ash receiver 28 in the open posiiton with the chamber 40 in front of the panel member 10 accessible for ready use. From this position the ash receiver 28 may be easily removed for emptying the contents of the chamber. The portion of the ash receiver 28 extending beyond the opening 12 is grasped by an operator and the receptacle is pulled outwardly. The magnetic attraction between the pivot pins 26 and the open bearings 24 is broken leaving the ash receiver 28 as a detached structure.

The receptacle 28 is relocated within the opening 12 from the position shown in Figure 3 by moving the upper portion of the cover plate 30 towards the opening 12. The cover plate skirt 48 is thereby disengaged from the bar magnet 18 and the receptacle bottom plate 38 is once more engaged and magnetically held thereto, as shown in Figure 1.

It is to be understood that the form of the invention herein illustrated and described in detail is not meant to limit the invention. It is intended that this ash receiver may also be constructed of a magnetically responsive material thereby eliminating the need for attaching a magnetically responsive strip or backing plate. It is still further intended that this invention may be employed with receptacles other than ash receivers and in an altered form or with varied details of arrangement without departing from the spirit of the invention or the scope of the appended claims.

I claim:

1. A receptacle disposed within an opening formed in a panel member and including magnetically responsive parts, means for mounting said receptacle within said opening for pivotal movement between concealed and usable positions, and a magnetic member mounted within said opening and disposed to be between said magnetically responsive parts of said receptacle as mounted within said opening for automatically engaging said parts to hold said receptacle in either of said two positions.

2. In a panel member having an opening formed therethrough, a receptacle removably secured within said opening, pivotal support means associated with said panel member and said receptacle to enable pivotal movement of said receptacle within said opennig between concealed and usable positions thereof, and a bar magnet disposed behind said opening and parallel to said support means, said receptacle including magnetically responsive portions disposed to engage said bar magnet and to be magnetically held thereto in both said concealed and usable positions thereof.

3. In an ash receiver, a vertical panel member having an opening formed therein, a bar magnet horizontally positioned and secured to said panel member across said opening, said magnet including bearing means disposed adjacent the sides of said openings, a receptacle open at its upper end and having support means secured at the sides and near the bottom thereof for engagement within said bearing means, a cover plate forming the forward wall of said receptacle and including a skirt extending below said receptacle, said receptacle being pivotally mounted within said opening for tiltable movement into and out of said opening, said skirt and said receptacle bottom being adapted to engage said magnet and being magnetically responsive thereto for retaining said receptacle alternately concealed within said opening or having the open end thereof exposed beyond said panel member opening.

4. An ash receiver adapted to be removably mounted within an opening formed within a panel member and comprising a receptacle opening upwardly and having a downwardly extended skirt formed therebeneath, a bar magnet horizontally positioned across said opening and secured to said panel member, said magnet including bearing means disposed adjacent the sides of said opening, support means secured to opposite sides of said receptacle and received within said bearing means for tiltably mounting said ash receiver within said opening, said support means being conductive of magnetic flux for attraction to said bearing means, said bar magnet being adapted to magnetically engage said ash receiver and to limit tiltable movement thereof within said opening between closed and open positions by alternate engagement with either said skirt or the bottom of said receptacle, said skirt and said receptacle bottom being conductive of magnetic flux for attraction to said bar magnet.

5. A housing member having an opening formed therein, an ash receiver removably mounted within said housing for pivotal movement into and out of said opening, and a single magnetic means secured to said housing and disposed within said opening for engaging said ash receiver in both open and closed positions and limiting the pivotal movement thereof, said ash receiver including magnetically responsive portions disposed for engagement with and attraction to said magnetic means for retaining said ash receiver thereto in either of said positions.

6. An ash receiver assembly including a housing structure having an opening formed therein, an ash receiver pivotally mounted within said opening for tiltable movement into and out of said housing, a magnetic bar secured to said housing and disposed within said opening, said bar being disposed for cooperative engagement with said ash receiver and to limit tiltable movement thereof into and out of said opening, said ash receiver including magnetically responsive portions disposed for attraction to said magnetic bar in either of said positions for retaining said ash receiver thereto upon engagement therewith.

7. An ash receiver assembly including a housing structure having an opening formed therein and an ash receiver having a bottom wall and downwardly extending flange of magnetically responsive material, said ash receiver being pivotally mounted within said opening for tiltable movement into and out of said housing, a magnetic bar secured to said housing and disposed within said opening, said bar being disposed between said bottom wall and flange of said ash receiver as mounted within said opening for cooperative engagement with and attraction therebetween alternately to limit tiltable movement of said ash receiver into and out of said housing and to magnetically retain said ash receiver in such limited positions.

8. An ash receiver assembly adapted to be pivotally mounted within a housing structure having an opening formed therein, said assembly including a receptacle having magnetically responsive wall portions and magnetic means for engaging and attracting said wall portions to dispose said receptacle relative to said housing in concealed and accessible positions, said receptacle being removably mounted within said housing for tiltable movement into and out of said opening, and said magnetic means being secured to said housing and disposed within said opening between said wall portions for engaging and limiting movement of said receptacle and for magnetically attracting and retaining said receptacle thereto.

9. An ash tray assembly including an ash receptacle and a magnetic retainer, said receptacle being adapted for pivotal mounting within a housing structure having an opening formed therein and for tiltable movement into and out of said opening, said magnetic retainer being cooperatively disposed within said opening in close proximity to said receptacle to limit the open and closed tiltable movement thereof, and magnetically responsive materials provided upon said receptacle and disposed on opposite sides of said retainer as said receptacle is mounted within said housing for attraction to said magnetic retainer upon engagement therewith at the limited open and closed tiltable positions thereof.

References Cited in the file of this patent

UNITED STATES PATENTS

| | | |
|---|---|---|
| Re. 21,441 | Visser | Apr. 30, 1940 |
| 2,000,275 | De Boer | May 7, 1935 |
| 2,048,363 | Vogel | July 21, 1936 |
| 2,288,688 | Dubilier | July 7, 1942 |
| 2,496,691 | Berry | Feb. 7, 1950 |
| 2,505,324 | Hendricks | Apr. 25, 1950 |
| 2,508,305 | Teetor | May 16, 1950 |

FOREIGN PATENTS

| | | |
|---|---|---|
| 617,186 | Great Britain | Feb. 2, 1949 |